Jan. 17, 1933.   W. H. BOZARTH   1,894,729
MACHINE FOR AND METHOD OF SPRAY COATING
Filed Jan. 11, 1929   6 Sheets-Sheet 5
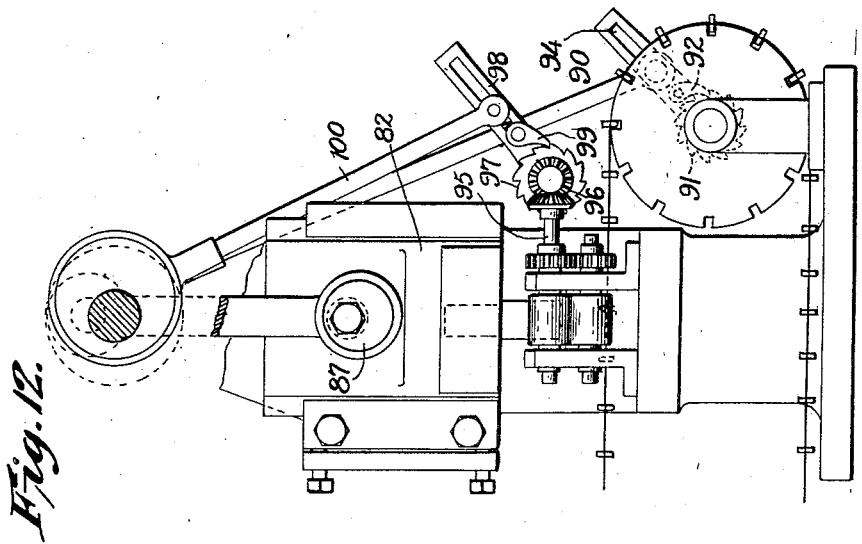
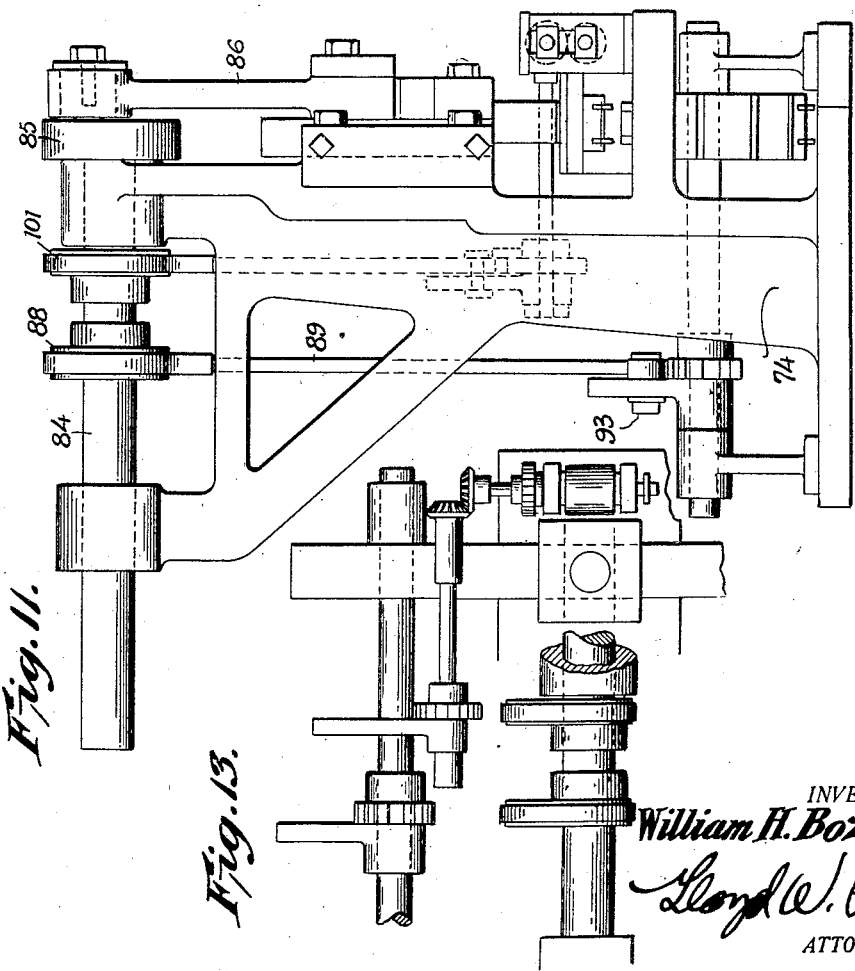
INVENTOR.
William H. Bozarth
Lloyd W. Patch
ATTORNEY.

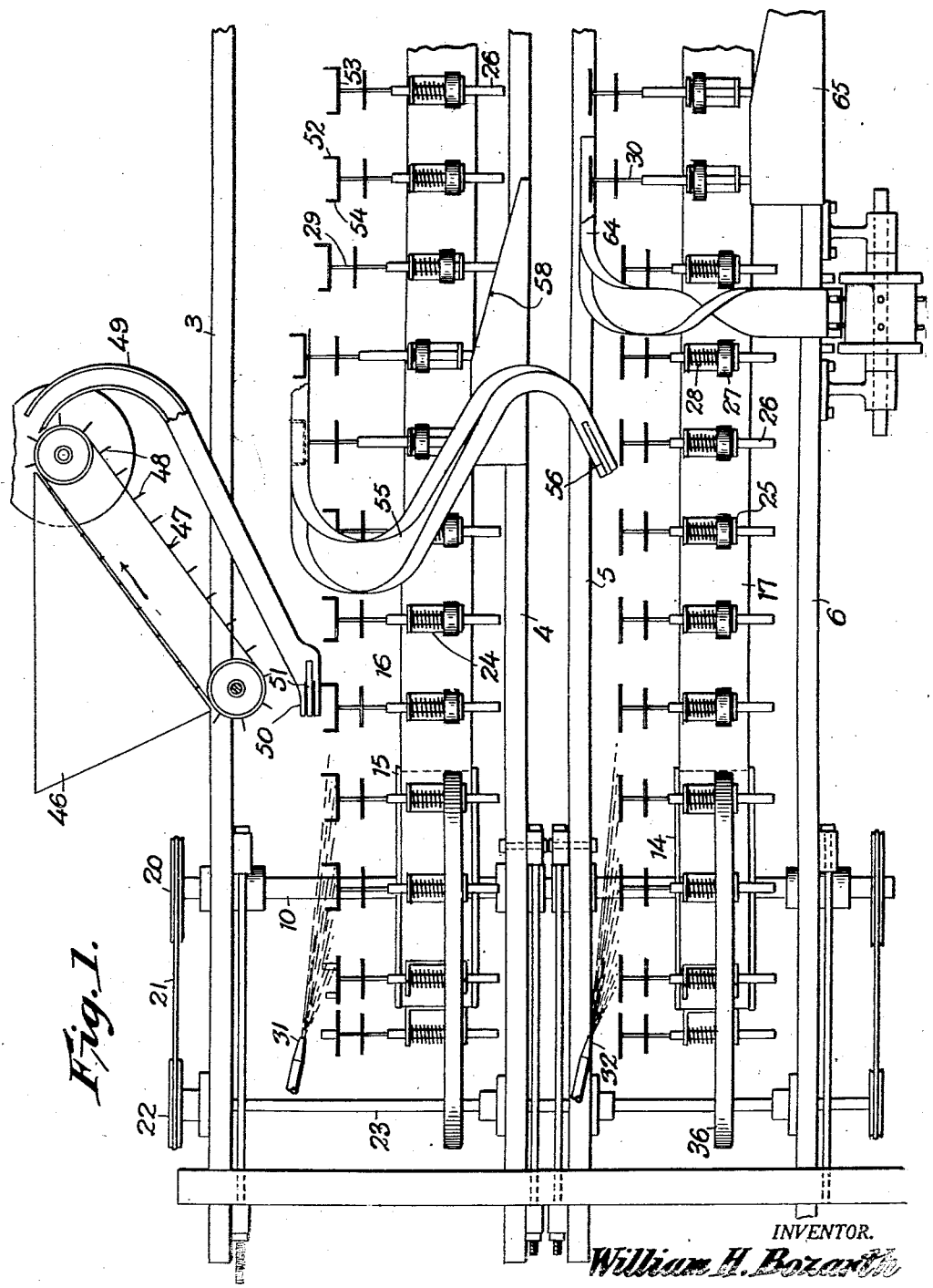

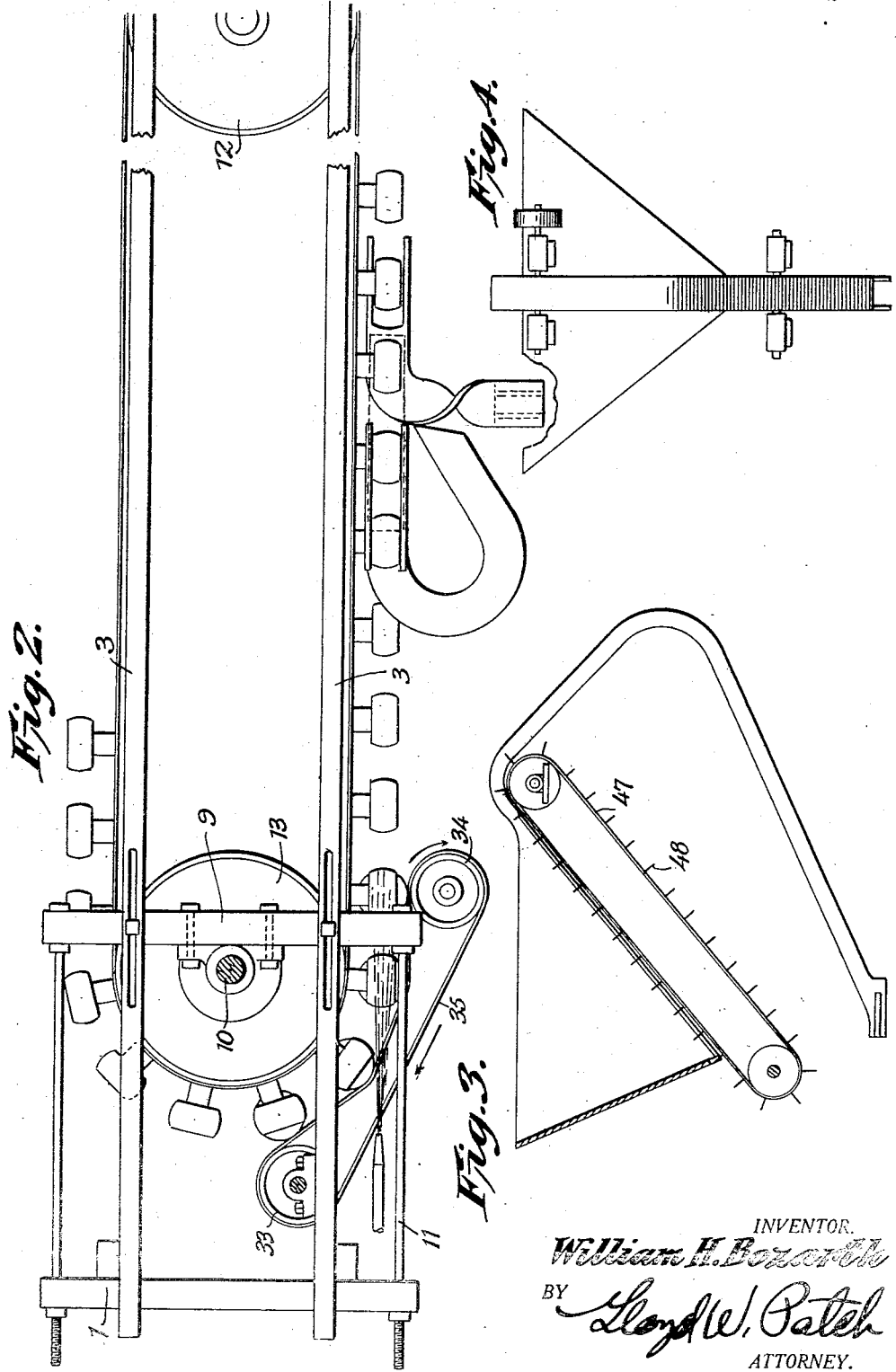

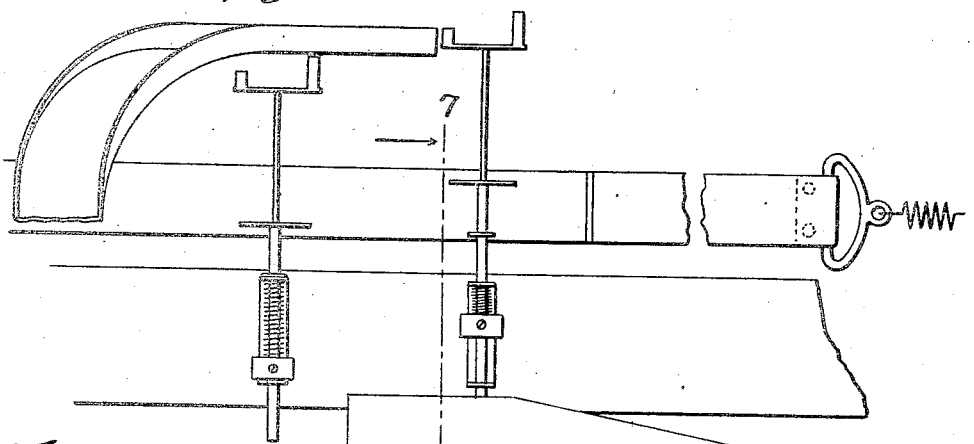
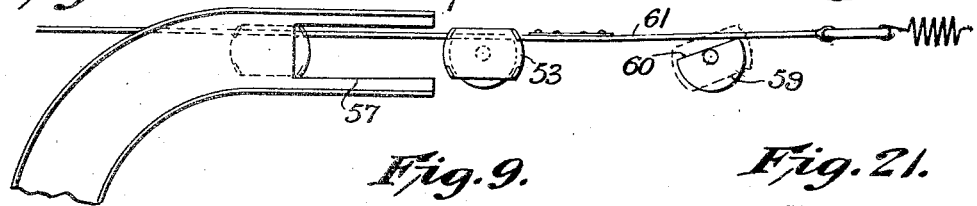
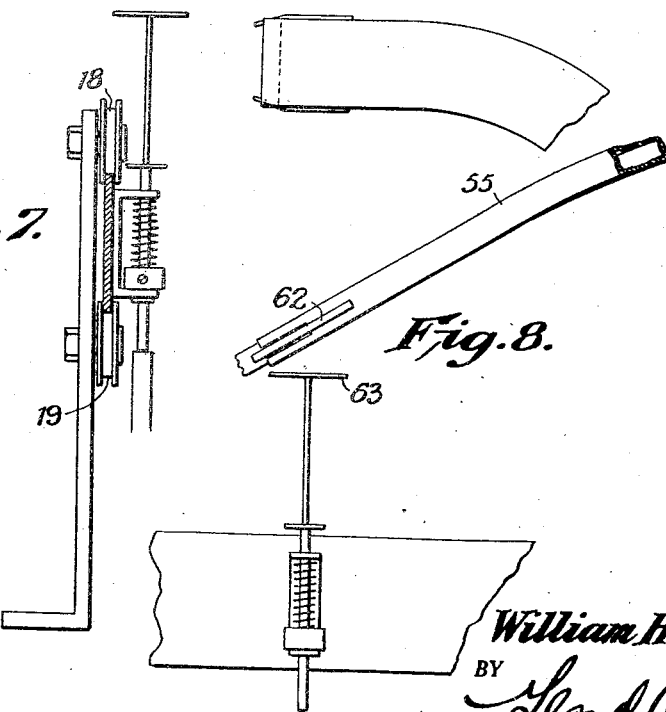

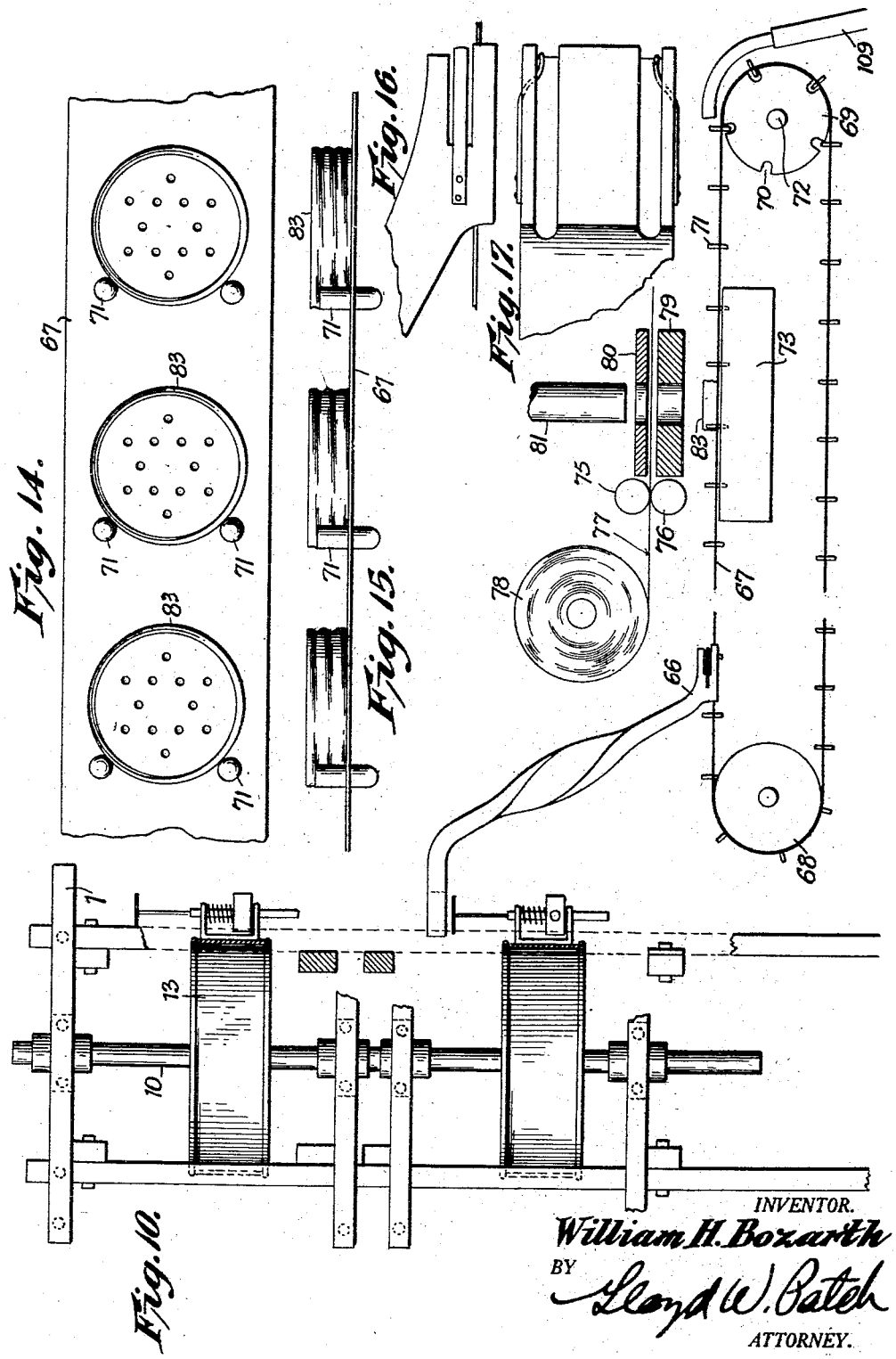

Jan. 17, 1933.  W. H. BOZARTH  1,894,729
MACHINE FOR AND METHOD OF SPRAY COATING
Filed Jan. 11, 1929   6 Sheets-Sheet 6
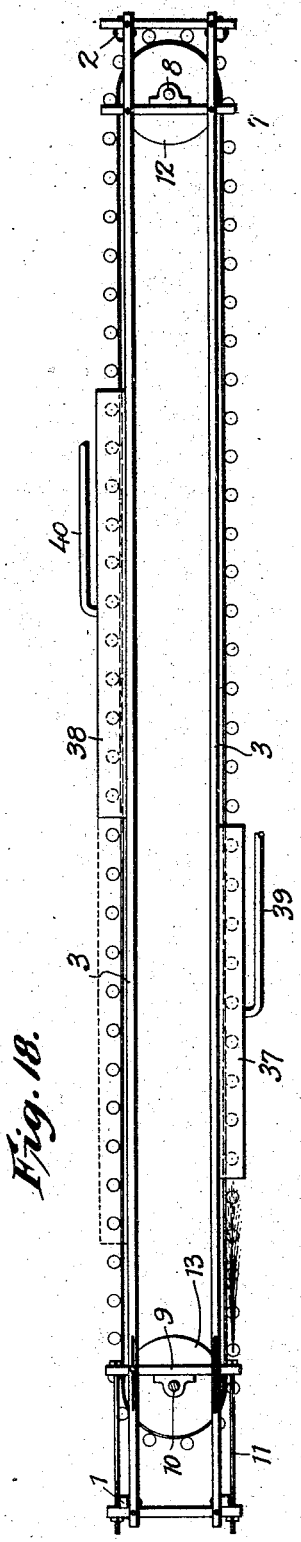
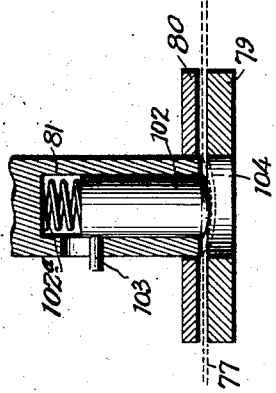
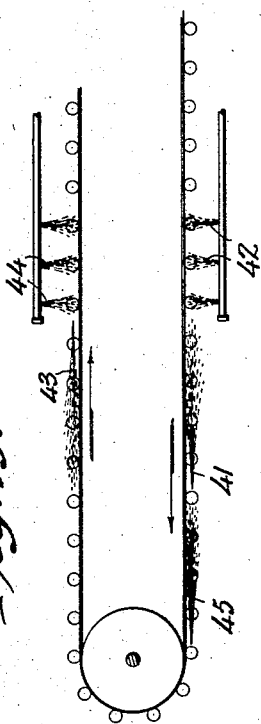
INVENTOR.
William H. Bozarth
BY
ATTORNEY.

Patented Jan. 17, 1933

1,894,729

UNITED STATES PATENT OFFICE

WILLIAM H. BOZARTH, OF VINELAND, NEW JERSEY, ASSIGNOR TO EASTERN CAP SPRAYING CO., INC., A CORPORATION OF NEW JERSEY

MACHINE FOR AND METHOD OF SPRAY COATING

Application filed January 11, 1929. Serial No. 331,804.

My invention relates to a machine for and method of spray coating, and particularly to an apparatus and method adapted to be used in coating articles with paint, enamel, lacquer, and other materials intended and adapted to cover the surface of the article, to rust-proof the same, to change the color or for other purposes.

An object of my invention is to provide a machine which is substantially automatic in its operation and which will accomplish the desired result with efficiency and dispatch and will deliver the finished product ready for use.

Another object resides in so constructing the parts that adjustments can be made to suit the apparatus for coating various sizes and shapes of articles and for applying various coating materials or compositions.

A further object is to provide apparatus which will coat one side or both sides of an article and which will handle the same to present the sides successively, without handling or manipulation by the operator.

Still another object is to provide an apparatus which is particularly adapted to be used in coating screw caps used as closures for jars and in other connections and which embodies means for applying liners to the caps.

Another object is to provide a method or process of spray coating articles which contemplates the feeding of the articles in a raw or unfinished condition and which carries the article through various steps to deliver the same as a completely finished product ready for instant use.

A still further object is to provide a process through which the article to be coated can be carried progressively to accomplish the application of the coating under most ideal conditions and to dry or cure the coating, without handling by the operator, so that the finished articles are delivered in a clean, sanitary condition, untouched by human hands, thus obviating the necessity of sterilization or other treatment where the process employed in coating some article such as a jar closing cap or other article which would not lend itself to most effective use for being handled.

With the above and other objects in view, which will be apparent to those skilled in the art, my invention includes certain novel features of construction and combinations of parts which will be hereinafter set forth in connection with the drawings and then particularly pointed out in the claims.

In the drawings:

Figure 1 is a view in side elevation of one end of a machine constructed in accordance with my invention and adapted to carry out my improved method.

Fig. 2 is a top plan view of the structure shown in Fig. 1.

Fig. 3 is a detail view, partly in section, to better show the feed hopper.

Fig. 4 is a view in front elevation of the structure shown in Fig. 3.

Fig. 5 is a fragmentary detail view showing an article discharge.

Fig. 6 is a top plan view of the showing in Fig. 5.

Fig. 7 is a transverse sectional view substantially on line 7—7 of Fig. 5.

Fig. 8 is a fragmentary view to better show an intermediate article feed tube.

Fig. 9 is a detail view in top elevation of the tube illustrated in Fig. 8.

Fig. 10 is a fragmentary view in transverse vertical section through the mechanism shown in Fig. 1.

Fig. 11 is a view in side elevation of the liner coating and inserting mechanism employed when the machine is used in coating and finishing screw closure caps.

Fig. 12 is a view in front elevation of the mechanism shown in Fig. 11.

Fig. 13 is a fragmentary application view showing the driving arrangement for the liner inserting mechanism.

Fig. 14 is a fragmentary view of the conveyer carrying the closure caps to have the liners inserted.

Fig. 15 is a view in edge elevation of the showing in Fig. 14.

Fig. 16 is a fragmentary view in elevation of the delivery end of the tube supplying caps to the liner inserting mechanism.

Fig. 17 is a bottom plan view of the showing in Fig. 16.

Fig. 18 is a diagrammatic plan view of a modified arrangement of the entire mechanism.

Fig. 19 is a fragmentary schematic view of the conveyer showing a modified arrangement of the parts.

Fig. 20 is an enlarged detail sectional view of the liner cutting and inserting punch.

Fig. 21 shows a modified form of article support.

The machine is built up on an elongated frame which is supported by posts 1 and 2, as shown in Fig. 18, and these have the pairs of longitudinal frame members 3, 4, 5 and 6 connected therebetween to be horizontally disposed with the several pairs arranged one above the other in spaced relation, as best shown in Fig. 1. Fixed cross bars 7 are provided at one end of the frame or supporting structure and have bearings to mount shaft 8 in perpendicular position substantially centered between the side bars of each set or pair. Movable cross bars 9 at the remaining end of the supporting or frame structure have bearings in which shaft 10 is journalled in like relation, and these movable cross bars 9 are adjusted through the medium of adjusting rods 11 to move shaft 10 toward or away from shaft 8.

Belt pulleys 12 and 13 are mounted on the shafts 8 and 10 between the two pairs of longitudinal frame members 3 and 4, and similar belt wheels 14 are mounted on the two shafts to be disposed between the pairs of longitudinal frame members 5 and 6. The several belt wheels are preferably provided with annular flanges 15, and the upper and lower belts 16 and 17 fitted upon the upper and lower sets of belt pulleys will thus be held against shifting therefrom. By moving the cross bars 9, the shaft 10 can be adjusted to tighten the belts 16 and 17 so that they will travel with relatively little slack, and to further insure that the belts will carry in the proper line without sagging, guide and supporting wheels 18 and 19 can be provided at intervals. A belt wheel 20 is provided on the shaft 10 and a belt 21 fitted upon this belt wheel 20 and a belt wheel 22 on power shaft 23 will cause the shaft 10 to be revolved, consequently causing the belts 16 and 17 to have progressive movement in one direction.

A plurality of supporting bearings 24 and 25 are secured upon the belts 16 and 17 in spaced relation with the bearing openings thereof substantially perpendicular, and a plurality of hollow spindles 26 are slidably mounted in the bearing openings. Belt wheels 27 are provided on each of the hollow spindles and springs 28 are fitted to normally hold the hollow spindles with the belt wheels 27 lowered within the supporting bearings but capable of sliding movement to rise vertically therein against the resilient pressure of springs 28. Article carriers 29 and 30 are fitted in the spindles 26 as carried by the belts 16 and 17 respectively, and these article carriers are disposed above the upper edge of each belt so that articles carried thereby will travel free in unobstructed paths along each side of the elongated frame and around the belt pulleys on the shafts 8 and 10.

Spray jets 31 and 32 are provided at the advance end of one run of each of the belts 16 and 17 respectively, and these spray jets or nozzles are adapted to spray coating material in a line angularly downwardly upon the article carriers 29 and 30 respectively in a direction opposed to and substantially in line with the path of movement of the article carriers. The spray jets can be constructed in any well known manner and can be supplied with coating material and pressure fluid from any desired source, such mechanisms being well known in the art and therefore not here illustrated or described in detail. The spray jets are preferably so directed that the coating spray therefrom will reach over at least two of the article carriers, with the apex of the spray preferably centered upon the path or line of movement of the article carriers. With this construction and arrangement of the parts the coating spray is directed in a manner to coat lightly upon the articles supported by the article carriers as the outer end of the spray is reached and the quantity of coating material applied will be increased until the apex of the spray jet is reached, at which point the final or finishing coating is applied. Belt wheels 33 and 34 are provided adjacent the mounting of the spray jet 31 for belt 16 to carry a friction belt 35, and similar belt pulleys are provided adjacent belt 17 to carry friction belt 36. The belt pulleys are revolved to cause the belts 35 and 36 to travel substantially in the direction indicated by the arrows in Fig. 2, or opposite to the direction of movement of the adjacent lead of the belts 16 and 17. The belts 35 and 36 are so positioned that as the spray nozzles or jets 31 and 32 are approached these belts will come in contact with the belt pulleys 27 on the spindles 26 and in consequence the article carriers 29 and 30 will be rotated to revolve the articles supported thereby to thus insure a proper and uniform coating on all parts of the articles. If desired, the belts 35 and 36 can be extended to contact with a greater number of belt pulleys 27 to thus revolve a greater number of the article carriers.

It is one of the purposes of my invention to provide an apparatus with mechanism which will take the caps from a quantity supply, will pass the same through the coating steps, and will discharge the caps or other articles completely finished and ready for use, and to this end the machine is preferably made sufficiently long to give a considerable travel for the articles following the application of the coat, so that the coating material will have a sufficient interval to set or cure intermediate the various steps and following the final coating. However, it may be found advisable in some instances to provide an oven-shaped conduit or tempering box 37 on the approach lead of the belt 16 so that the articles moving upon the article carriers 29 will be brought substantially to the temperature best suited for application of the coating material, and an oven-like conduit or drying chamber 38 can be provided adjacent the opposite run of the belt 16 so that the articles passing therethrough will be subjected to drying or curing air currents, heat, or the like. Tempering and drying air or heat can be supplied to the conduits 37 and 38 through pipes 39 and 40. In place of the conduits 37 and 38 as illustrated in Fig. 18, air blasts or air currents might be circulated around the articles upon the approach and receiving sides of the belt to temper the articles before coating and to dry or cure the coating material after the coating operation. The tempering air jets might be directed longitudinally as indicated at 41 or laterally as shown at 42, and the drying or curing air jets can be directed longitudinally opposite to or in line with the path of travel, as indicated at 43 or laterally as indicated at 44, the coating material spray being indicated at 45. While I have set forth the tempering and drying or curing steps and apparatus only with respect to the belt 16, it will be understood that similar arrangements might be made with respect to belt 17; the important requirement being that the tempering apparatus must be disposed to carry out the tempering step after the articles have been placed upon the article carriers and that the drying or curing step must be accomplished with the apparatus placed in advance of the point at which the coated articles are removed from the carriers.

In the adaptation shown in Fig. 1, I have illustrated the parts constructed to take screw closure caps, either with slot or perforated tops, adapted to be applied to bottles, jars and the like, and which apparatus will coat first the inner side and then the outer side, means being provided to handle caps automatically at all times. The supply hopper 46 is provided with an open sloping bottom and a conveyor belt 47 traveling in the direction indicated by the arrow has a plurality of pins 48 thereon to engage in the open sides of the closure caps and carry the same up to be placed in a conveyor tube 49 to be dropped by gravity to a supply mouth 50.

This supply or feed mouth 50 has slots through the bottom thereof parallel with the belt 16 and spring fingers 51 are provided to hold the lowermost cap in place. The cap supply mouth 50 is in line with the article carriers 29 and prongs or fingers 52 are provided on the supporting heads 53 of the article carriers 29 to travel through the slots in the lower side of the supply mouth 50 and withdraw one cap as each article carrier passes, fingers 54 being provided on the opposite sides of the supporting heads 53 to insure that the caps will be held against displacement. As the caps are withdrawn from the supply mouth 50 by the fingers 52 they will be deposited upon the supporting heads 53 with their outer sides exposed and as the belt 16 travels forward the caps will be carried through the spray from the coating nozzle 31, the carriers being rotated by the belt 35 to revolve the articles within the spray to insure uniform coating. As the belt 16 travels on around belt pulley 13 the articles will be exposed to atmospheric air or other fluid to cause drying or curing of the coating, and as the travel of the belt 16 is continued and the coated articles again approach the location of the supply mouth 50, the coating will have hardened or cured sufficiently to permit removal of the caps.

Slightly in advance of the supply mouth 50 I locate the upper end of a reversing chute 55 which has its lower end terminating in a cap supply mouth 56 disposed adjacent the path of movement of article carriers 30. The upper end of the reversing chute 55 has a notch 57 cut through the bottom wall thereof, as shown in Fig. 6, and the supporting heads 53 are reduced on opposite sides so that they will pass through and clear the width of notch 57. A cam 58 has the contact face thereof inclined upwardly slightly in advance of the end of reversing chute 55 so that the lower ends of spindles 26 mounted in the supporting bearings 24 will engage therewith, and in consequence these spindles will be slid upwardly within the bearings against the resilient pressure of springs 28 so that the supporting heads 53 will be raised to carry the screw caps supported thereon into the open end of reversing chute 55. The cam 58 is stopped at a point in advance of a perpendicular line taken from the inner edge of notch 57, and in consequence the hollow spindles 26 will ride over the cam 58 and the spindles will be again forced down by springs 28 to retract article carriers 29 from the upper end of reversing tube 55 and leave the caps within the tube. To insure that the supporting heads 53 will be presented at all times with the reduced sides positioned to pass through the notch 57, I provide a straightening device as best shown in Fig. 6. The article carrier has a cam 59 on the stem thereof of substantially semi-circular form with the flattened side 60 adapted to slide against a resiliently mounted guide bar 61 which will straighten up or properly line the carriers to present the supporting heads 53 in the relation shown in Fig. 6. This guide 61 cannot be extended only a distance sufficient to insure proper straightening of the article carriers and will not in any way interfere with the free rotation of the article carriers by the belt 35. The cap supply mouth of the tube 55 is preferably of the form shown in Figs. 8 and 9, the spring fingers 62 revolving the lowermost cap with the recessed side downwardly and projecting into the path of the supporting head 63 of the article carriers 30. With this arrangement the caps are taken from the reversing chute 55 and are deposited upon the supporting heads 63 with their outer surfaces exposed to be coated as the belt 17 carries the cap through the spray material discharged from spray nozzle 32.

The belt 17 carries the coated caps around the opposite side of the machine and adjacent to and on the advance side of the supply mouth 56 of reversing chute 55, a second reversing chute 64 is provided. A cam 65 serves to elevate the article carriers 30 to carry the caps into the open end of chute 64 and upon passing the end of cam 65 the article carriers drop to leave the caps in the chute 64. As the caps slide by gravity through chute 64 they are reversed to present the open sides uppermost when the caps reach the feed mouth 66. The chute 64 might be employed as a discharge chute to deliver the finished product, but in the case of closure caps it is desirable that liners be inserted in the tops of the caps and with the caps reversed and presented at the supply mouth 66 with their open sides uppermost, the caps are in a position for ready insertion of liners.

A conveyor 67 runs over wheels 68 and 69 with the upper portion thereof extending substantially horizontal and passing adjacent supply mouth 66. The wheel 69, which is the driven wheel, has notches 70 therein and carrier pins 71 placed at spaced points along the length of the conveyor belt 67 extend through the belt to fit into the notches 70 so that the conveyor belt will be carried and positively controlled by movement of shaft 72 on which wheel 69 is mounted. The conveyor belt 67 travels through the supply mouth 66 substantially as shown in Figs. 10 and 16 and the closure caps or other articles within the chute 64 will be taken off and carried by the pins 71 in predetermined spaced relation upon the upper horizontally extending portion of the conveyor belt to be carried over a supporting block 73.

The liner inserting mechanism, as best disclosed in Figs. 11, 12 and 13, is carried by a supporting frame 74 through which the conveyor belt 67 passes, and this supporting frame structure has the block 73 mounted thereon. Rollers 75 and 76 are adapted to feed a strip of liner material 77 from a roll 78 so that the strip will be carried over the opening of a die block 79. A stripper 80 is placed adjacent the die block 79, and the strip of sheet liner material is to be fed through the space between these members with a step by step movement, only sufficient material being fed at each step to cover the opening of the die block so that a liner can be cut therefrom.

A punch 81 is carried by a sliding head 82 to work through the opening of the strip block 80 and cooperate with the die block 79 to cut a liner of the desired shape and size, and upon contingent movement the punch 81 serves to carry the liner disk through the punch block and place the same within a cap carried by the conveyor belt 67 and positioned over the block 73, as shown in Fig. 10.

As will be appreciated the conveyor belt 67 must be actuated to travel progressively with a step by step movement so that the caps 83 will be centered beneath the opening of the die block 79; the liner strip feed must be actuated to feed a sufficient length of the liner strip to form a perfect liner; and, the movement of the punch must be synchronized so that the punch will descend during the interval of pause in the travel of the cap and the feed of the liner strip 77. To accomplish this I provide a drive shaft 84 mounted in suitable bearings on the upper part of the supporting frame structure 74 and drive this shaft through any suitable gearing or other power connection, not shown. An eccentric disk 85 on one end of shaft 84 has a pitman rod 86 mounted on the crank pin thereof and an adjusting eccentric pin 87 connects the remaining end of this pitman rod with the slide block 82. By adjusting pin 87 the length of the downward stroke of travel of the punch 81 can be governed to adapt the mechanism for insertion of liners in caps of different thickness and depth and for insertion of different thicknesses of liner material. The reciprocatory movement of the punch 81 will be substantially uninterrupted during rotation of shaft 84, and the movement of the conveyor belt 67 and the liner strip 77 must be synchronized correspondingly. An eccentric 88 on shaft 84 has a pitman rod 89 connected therewith and extending to be pivotally connected with a rocker arm 90 fitted on shaft 72. A ratchet wheel 91 is mounted in conjunction with the conveyor belt wheel 69 and a pawl 92 on the rocker arm 90 works in conjunction with the ratchet wheel 91. As the shaft 84 is revolved, rocker arm 90 will be oscillated to impart step by step movement to the wheel 69 to progressively move the conveyor belt 67. The length of the movement imparted to the conveyor belt can be adjusted by moving the pivot pin 93 of pitman 89 along the length of slot 94 in the rocker arm.

The liner strip feed roller 75 has a miter gear 95 on one end thereof in mesh with a miter gear 96 carried on a suitable journalled shaft and having ratchet wheel 97 connected therewith. A rocker arm 98 is mounted on the shaft carrying the miter gear 96 and has a pawl 99 working against the teeth of the ratchet wheel. A pitman rod 100 adjustably connected with the rocker arm 98 after the manner of the adjustable connection of pitman rod 89 has its remaining end fitted upon an eccentric 101 on shaft 84. By adjusting the pivot connection of the pitman 100 along the length of the slot in the rocker arm 98 the length of the liner strip fed over the die block 79 can be varied to suit the particular requirements of use.

As many closure caps used upon jars and in other connections have threads around the flange thereof which form an internal diameter less than the inside diameter of the cap adjacent the head, and the punch 81 must be of a size to pass into the cap without severe contact with the threads of the side wall, it is desirable that some means be provided to insure formation of a liner of slightly larger diameter than the external diameter of the punch. Referring to Fig. 20, I core out the cutter end of the punch 81 and slidably mount therein a plunger 102 which has a convex lower end protruding below the cutting edge of the punch. A spring 102a is provided to hold the plunger 102 normally with its end extended, and as the punch comes down upon the liner strip material 77 the material will be bowed down, after the manner shown by the dotted lines, within the opening 104 of die block 79 and excess material will thus be accumulated prior to the cutting or punching operation. When a liner disk cut in this manner is placed within the cap 83 the material of the liner will expand to substantially fill the inside diameter of the cap and thus give complete coverage.

A pin or lug 103 carried by plunger 102 projects through a slot in the punch 81, and as the punch travels down this pin will contact with the stripper 80 to withdraw the protruding end of the plunger just prior to the time that the liner reaches the top of the cap. The punch then continues its movement, the liner expands to its full diameter and the annular flat end of the punch seats the liner firmly in place.

As shown in Fig. 21, the article carriers might be made with a hollow tube 105 extending from the spindles 26 upwardly and article carriers can be interchangeably fitted to these hollow tubes. In the present instance I have shown a flat article supporting table or head 106 carried by a stem 107 adapted to be inserted in the tube 105, and this stem 107 is bowed as at 108 to grip frictionally within the tube 105 to thus hold against accidental or casual displacement.

As shown in Fig. 10, a cap or article removal chute 109 can be employed to take the finished product from the conveyor belt 67, or any other suitable means can be employed to accomplish this purpose. The finished caps or other articles will thus be delivered untouched by the human hand and in condition to be used without being sterilized or otherwise cleaned or treated.

My improved mechanism can be used to coat caps or other articles on the inside and the outside, or to coat articles on only predetermined portions, and the mechanism particularly adapts itself for use with sprinkler top caps made up of metal lithographed or otherwise printed or decorated before being cut and formed as a single spray coating of the inside of the cap will then apply a progressive film or coating at the raw edges left around the flange of the closure cap and at the edges of the sprinkler openings.

From the foregoing it will be seen that I have provided a machine which will operate efficiently to accomplish the purposes and objects of my invention, and a process which will serve to efficiently and economically accomplish the desired results and, while I have herein shown and described only certain specific embodiments and arrangements of the mechanism and have set forth only certain steps and sequences of operation in carrying out the process, it will be appreciated that many changes and variations can be made in the form, construction and arrangement of the parts, and in the carrying out of the steps of coating articles, without departing from the spirit and scope of my invention.

I claim:

1. A spray coating machine comprising a plurality of article carriers, a spray jet, means for progressively moving the carriers through the path of the jet spray, means to rotate said carriers to expose all parts of the articles to the spray, and means to bodily raise said article carriers vertically with the articles supported thereby.

2. A spray coating machine comprising a plurality of article carriers, means for progressively moving the carriers on a substantially horizontal plane, a spray jet mounted to discharge into the path of the moving carriers in a direction blowing substantially against the direction of movement, and means to bodily raise said article carriers vertically with the articles supported thereby.

3. A spray coating machine comprising a plurality of article carriers, means for progressively moving the carriers on a substantially horizontal plane, a spray jet mounted to discharge into the path of the moving carriers in a direction blowing substantially against the direction of movement, means to rotate said carriers during the interval of passing the spray jet, and means to set each of said article carriers in predetermined relation following rotation.

4. A spray coating machine comprising a plurality of article carriers adapted to support the articles to be coated to present a predetermined portion thereof, a jet to spray coating material, means for progressively moving said article carriers into and out of line with the spray from the jet, means to remove the articles from said article carriers and manipulate the same to present another predetermined portion, a second lot of article carriers to receive and carry the articles to present the second predetermined portion, means to move said second set of article carriers progressively, a spray jet located to spray into the path of movement of the second set of article carriers, and means adjacent both spray jets to rotate the article carriers.

5. A spray coating machine comprising a plurality of article carriers adapted to support the articles to be coated to present a predetermined portion thereof, a jet to spray coating material, means for progressively moving said article carriers into and out of line with the spray from the jet, means to bodily raise said article carriers vertically with the articles thereon, means to remove the articles from said article carriers when raised and manipulating the same to present another predetermined portion, a second lot of article carriers to receive and carry the articles to present the second predetermined portion, means to move said second set of article carriers progressively, a spray jet located to spray into the path of movement of the second set of article carriers, means to bodily raise said article carriers vertically with the articles thereon, and means to remove the articles from said second set of article carriers when raised and discharge the same to present a predetermined portion.

6. A spray coating machine comprising a plurality of article carriers, a jet to spray coating material, means for progressively moving said article carriers past said spray jet in a path in line with and in a direction opposite to the ejection of the coating spray, means to rotate said article carriers while passing through the spray, means to temper said articles to a point substantially best calculated to take the coating material prior to submission to the spray, and means to aid in curing the coating following application thereof.

7. A spray coating machine comprising a plurality of article carriers, means for progressively moving said article carriers in a predetermined path, means to place the articles to be coated upon said article carriers with predetermined portions thereof exposed, a spray jet for spraying coating material positioned to eject a coating spray in line with and in a direction opposite to the path of movement of the article carriers, means to rotate said article carriers while passing through the spray, and means to remove the articles from said article carriers.

8. A spray coating machine comprising a pair of elongated belts carried to travel in a substantially horizontal path, a plurality of article carriers mounted in spaced relation upon each of said belts, an article delivery chute, means to deliver said articles to said chute to be taken by the article carriers of one belt and carried along therewith with predetermined portions presented, a jet to spray coating material upon said articles, means to remove said articles from the article carriers of the first-mentioned belt and present the same to be taken by the article carriers of the second belt with predetermined portions presented, and a jet to spray coating material upon the articles as moved by the article carriers of the second belt.

9. A spray coating machine comprising a pair of elongated belts carried to travel in a substantially horizontal path, a plurality of article carriers mounted in spaced relation upon each of said belts, an article delivery chute, means to deliver said articles to said chute to be taken by the article carriers of one belt and carried along therewith with predetermined portions presented, a jet to spray coating material upon said articles, means to remove said articles from the article carriers of the first-mentioned belt and present the same to be taken by the article carriers of the second belt with predetermined portions presented, a jet to spray coating material upon the articles as moved by the article carriers of the second belt, and means to remove the articles from said second set of article carriers.

10. The method of spray coating articles which consists in moving the articles progressively and in directing a spray jet substantially in line with and opposite to the direction of movement to apply coating material to the moving articles to accomplish in effect a light priming coat at the outer end of the spray and a heavier finishing coat as the source of the spray jet is approached with the line of movement carrying the articles beyond the limits of the spray following application of the finishing coat, and revolving the articles while in the path of the spray to permit even application of the coating thereupon.

11. A spray coating machine comprising, a plurality of article carriers, means for progressively moving said article carriers in a predetermined line and direction, means to rotate said article carriers, and spray jets mounted vertically above the line of movement of said article carriers and disposed to spray coating material angularly downwardly upon and against the direction of movement of said article carriers as the same are progressively moved and rotated.

In testimony whereof I hereunto affix my signature.

WILLIAM H. BOZARTH.